United States Patent [19]
Yuzawa

[11] 3,803,813
[45] Apr. 16, 1974

[54] CLARIFYING DEVICE OF EXHAUST GAS

[76] Inventor: Masaharu Yuzawa, 21-23-17 Ota-ku Kamiikedai, Tokyo, Japan

[22] Filed: May 15, 1972

[21] Appl. No.: 253,309

[30] Foreign Application Priority Data
May 18, 1971   Japan.............................. 46-39971

[52] U.S. Cl...................... 55/246, 55/255, 55/256, 55/259, 55/DIG. 30, 55/387, 55/481, 60/310, 60/311
[51] Int. Cl............................................. B01d 47/02
[58] Field of Search ............. 55/255, 246, 256, 259, 55/DIG. 30, 387, 481; 60/310, 311

[56] References Cited
UNITED STATES PATENTS

| | | | |
|---|---|---|---|
| 1,716,479 | 6/1929 | Bilsky | 55/DIG. 30 |
| 2,575,359 | 11/1951 | Ortgies | 55/246 |
| 3,177,650 | 4/1965 | Caruso | 55/DIG. 30 |
| 3,642,259 | 2/1972 | Bowden | 55/DIG. 30 |
| 3,695,005 | 10/1972 | Yuzawa | 55/225 |

Primary Examiner—Bernard Nozick
Attorney, Agent, or Firm—McGlew & Tuttle

[57] ABSTRACT

The exhaust gas clarifying device comprises a clarifying tank, arranged to contain an exhaust gas clarifying solution, and having a pipe nozzle extending adjacent its bottom wall and formed with a plurality of apertures along its upper surface. An exhaust gas inlet pipe is connected to the pipe nozzle and an exhaust gas outlet pipe communicates with the clarifying tank through the top wall thereof. An upright lattice grid is positioned in the tank above the pipe nozzle to prevent overflowing of the clarifying solution when the automotive vehicle is on a grade or the like and to prevent loss of the clarifying solution by splashing. Valve means are provided for withdrawing and replenishing the clarifying solution. An adsorption casing is interposed in the exhaust gas outlet pipe and contains several longitudinally spaced transversely extending blocks of activated carbon, the box having a top cover which may be opened to easily remove and replace the activated carbon blocks. A filter net and a splash-preventing baffle are interposed, in the flow direction, between the lattice grid and the exhaust gas outlet pipe, and a liquid level gauge is provided on the exterior of the tank.

5 Claims, 5 Drawing Figures

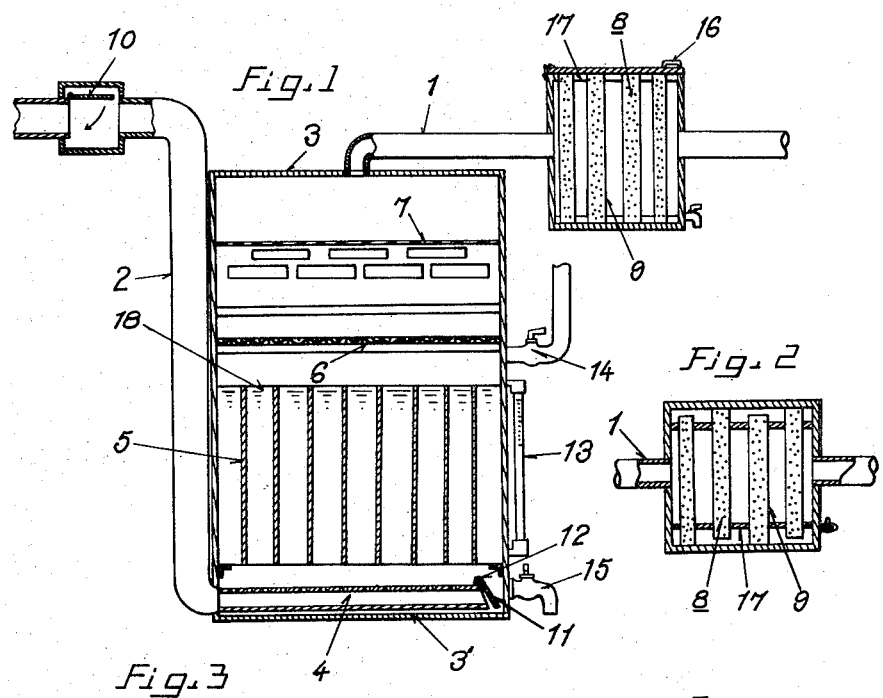
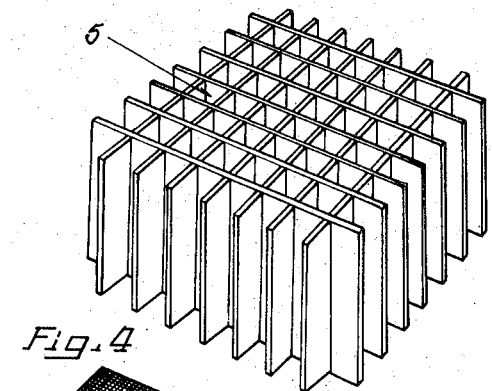
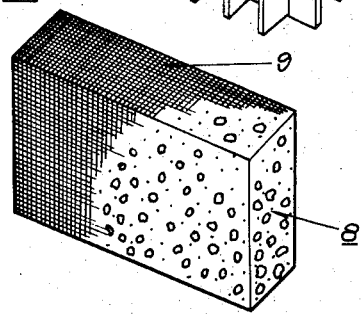
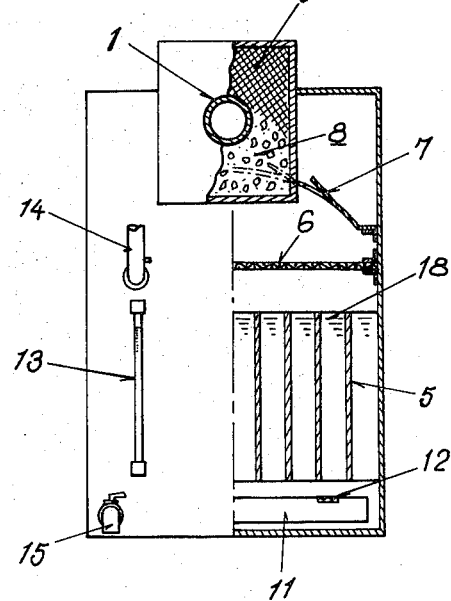

CLARIFYING DEVICE OF EXHAUST GAS

FIELD AND BACKGROUND OF THE INVENTION

This invention relates to devices for clarifying exhaust gas of the type in which harmful elements in the exhaust gas are dissolved and removed by the use of clarifying liquids and activated carbon. More particularly, the present invention is directed to a device of this type which is an improvement on that disclosed in my U.S. Pat. No. 3,695,005 issued Oct. 3, 1972.

There has recently arisen a wide-spread public concern with the pollution cause by the exhaust gases from automobiles and the harmful effects these exhaust gases have on the human body. Although various solutions have been proposed for the purpose of rendering these exhaust gases harmless, they generally have been too expensive and too inefficient for general application to automobiles.

The device shown in my U.S. Pat. No. 3,695,005 comprises a purification or clarifying tank arranged to have contained a purifying or clarifying liquid. A pipe nozzle extends across this tank adjacent its bottom end, and is formed with a longitudinal series of perforations in its upper surface. An exhaust gas inlet conduit is connected to this pipe nozzle, and an exhaust gas outlet conduit is connected to the top wall of the tank. The clarifying liquid in the tank is preferably an alkaline solution, and a filter plate, a baffle plate and an adsorption layer of particles of activated carbon is interposed between the liquid in the tank and the exhaust gas outlet conduit. The exhaust gases are thus purified by flowing through the clarifying liquid and through the layer of particles of activated carbon. However, although the device of my U.S. Pat. No. 3,695,005 has many advantages, a disadvantage is that the purification or clarification solution is agitated due to vibrations of the automobile, as well as being liable to spill when the automobile is on a steep grade, in addition to which removing or replacing the activated carbon layer is very inconvenient.

SUMMARY OF THE INVENTION

For the purpose of overcoming the mentioned disadvantages of the device shown in U.S. Pat. No. 3,695,005, the present invention provides a vertically oriented lattice grid on the bottom of the purification or clarifying tank to prevent the solution therein from overflowing, when the automobile is on a relatively steep grade, and splashing due to vibration of the automobile.

In addition, an adsorption box or casing is interposed in the exhaust gas outlet conduit connected to the upper wall of the clarifying tank, and contains several layers or inserts of particles of activated carbon so that the individual layers are not subjected to a high pressure of the exhaust gases. The arrangement is such that the layers may be readily removed and replaced.

An object of the present invention is to provide an improved purification or clarifying device for automotive exhaust gases, and including an upright lattice grid placed in a purification or clarifying tank to prevent the purification solution from overflowing, when the automotive vehicle is on a relatively steep grade, and to prevent splashing due to vibration of the automotive vehicle. Another object of the invention is to provide such a purification or clarifying device in which an adsorption box or container is interposed in an exhaust gas outlet conduit connected to the top wall of the container.

A further object of the invention is to provide such a device in which the adsorption box or container contains several easily interchangeable layers of particles of activated carbon arranged in spaced relation to each other whereby the individual layers are not subjected to the high pressure of the exhaust gases and replacement or interchange of the layers may be effected easily.

For an understanding of the principles of the invention, reference is made to the following description of a typical embodiment thereof as illustrated in the accompanying drawing.

BRIEF DESCRIPTION OF THE DRAWING

In the Drawing:

FIG. 1 is a vertical sectional view through an exhaust gas purification or clarifying device embodying the invention;

FIG. 2 is a horizontal sectional view through the adsorption box or casing;

FIG. 3 is a generally perspective view of an upright lattice grid incorporated in the invention device;

FIG. 4 is a generally perspective view of a replaceable layer of particles of activated carbon for use in the adsorption box or casing; and FIG. 5 is a side elevation view, partly in section, of the device of the present invention, with some parts being omitted for the sake of clarity.

DESCRIPTION OF THE PREFERRED EMBODIMENT

Referring to the drawings, exhaust gases from an automotive vehicle engine flow through an exhaust gas inlet tube 2 provided with a reverse flow check valve 10 and are directed into a pipe nozzle 4 adjacent the bottom 3' of a purification or clarifying tank 3. Nozzle 4 has a check valve 11 at its free end, and is formed with a plurality of small holes in its upper surface through which the exhaust gas is discharged into the tank 3. Tank 3 is filled with an alkaline purification or clarifying liquid or solution to the extent of nearly half of the volume of tank 3. In accordance with the invention, a lattice type grid 5 is immersed in the solution 18 above the pipe nozzle 4, and is designed to prevent the clarifying or purification liquid from overflowing, when the automotive vehicle is on a steep grade, or splashing, due to vibration of the automotive vehicle.

Above the purification or clarifying liquid or solution 18, tank 3 is provided with a filter plate 6 and an entrainment prevention baffle plate 7, having a clearance space between each other and a clearance space between filter plate 6 and the clarifying liquid 18. An exhaust gas outlet tube or conduit 1 communicates with tank 3 through the top wall thereof, and has interposed therein a substantially rectangular adsorption box in which there are several net cases 9 containing particles of activated carbon, these net cases 9 being arranged in spaced parallel relation. The net cases 9 are spaced from each other by spacers 17, and may be individually removed, replaced or interchanged by virtue of the casing or the like 8 having an openable cover 16. Preferably, net cases 9 are arranged vertically in box or casing 8 in parallel relationship, and preferably staggered as shown in FIG. 2, for better filtering, with each net case 9 containing particles of activated carbon as shown in FIG. 4.

In addition to the components so far described, a liquid level gauge 13 is provided on the tank 3, and the tank 3 has a controllable liquid inlet 14 and a controllable liquid drain 15, the check valve 11 being pivoted to pipe nozzle 4 at a hinge indicated at 12.

The arrangement operates in a manner which will now be described.

Exhaust gases are discharged into the clarifying liquid, through the small holes of nozzle 4, like bubbles. Soluble elements, for example, sulfurous acid gas, are dissolved and removed by the clarifying liquid, and small dust particles, like carbon particles, are removed by the clarifying liquid. The exhaust gases rise upwardly through the tank 3 and through the filter plate 6, which removes solid components from the exhaust gases, and the gases are discharged from tank 3 through exhaust gas outlet 2 over conduit 1 wherein the exhaust gases are completely purified by the net cases 9 containing the activated carbon layers. Carbon monoxide and sulfurous acid gases, which have passed through the clarifying liquid, are absorbed and removed by the small grains of activated carbons.

As compared to the prior art arrangement, the device of the present invention has the advantage that, due to the provision of the lattice grid member 5, the purification or clarifying solution can be prevented from overflowing and splashing even when the automotive vehicle vibrates excessively. Furthermore, due to the provision of the activated carbon layers, in the net cases 9, in parallel relationship with one another in the adsorption box, downstream from the tank 3, the carbon layers are not subjected to a high pressure from the gases whereby they have a longer life. Additionally, the net cases 9 can be easily removed and replaced. It should be noted that the upright lattice grid 5 is formed by plates of light synthetic resin which is free from damage by alkali and acid, these plates intersecting each other at right angles to form a series of honeycomb cells, of substantially rectangular cross section, which are upwardly elongated.

As above explained, the practical effect of the present invention is quite excellent.

What is claimed is:

1. In a device for purifying the exhaust gases from an automotive vehicles internal combustion engine, of the type in which the exhaust gases are supplied by an exhaust gas inlet conduit to a perforated pipe nozzle at the lower end of an upwardly elongated tank to bubble upwardly through a purification liquid in the tank and through a filter, and then passed through a layer of particles of activated carbon and discharged through an exhaust gas outlet conduit communicating with the upper end of the tank, the improvement comprising, in combination, an upwardly elongated lattice-type grid member positioned in said tank above said pipe nozzle and having its upper end substantially at the level of the purification liquid in said tank; said lattice-type grid member inhibiting overflowing of the purification liquid when the automotive vehicle is on a relatively steep grade and inhibiting splashing of the purification liquid due to vibration of the automotive vehicle.

2. In a device for purifying exhaust gases, the improvement claimed in claim 1, including plural layers of particles of activated carbon interposed, in spaced, parallel and transversely extending relation, in said exhaust gas outlet conduit downstream of said tank for a flow of the exhaust gases therethrough.

3. In a device for purfying exhaust gases, the improvement claimed in claim 2, including a casing interposed in said exhaust gas outlet conduit downstream of said tank, said layers of particles of activated carbon being interchangeably mounted in said casing.

4. In a device for purifying exhaust gases, the improvement claimed in claim 3, in which said casing is substantially rectangular and has an openable cover at one side; said layers of particles of activated carbon being substantially rectangular and being insertable into said casing and removable therefrom when said cover is opened; and spacers in said casing interposed between adjacent layers of particles of activated carbon.

5. In a device for purifying exhaust gases, the improvement claimed in claim 4, in which said layers of particles of activated carbon are arranged in laterally staggered relation in said casing.

* * * * *